United States Patent
Sato et al.

(10) Patent No.: US 9,904,095 B2
(45) Date of Patent: Feb. 27, 2018

(54) DISPLAY DEVICE AND LIQUID CRYSTAL DISPLAY DEVICE

(71) Applicant: Japan Display Inc., Tokyo (JP)

(72) Inventors: Toshio Sato, Tokyo (JP); Shinji Aotsuka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/342,176

(22) Filed: Nov. 3, 2016

(65) Prior Publication Data

US 2017/0075167 A1    Mar. 16, 2017

Related U.S. Application Data

(63) Continuation of application No. 14/203,724, filed on Mar. 11, 2014, now Pat. No. 9,519,180.

(30) Foreign Application Priority Data

Mar. 12, 2013    (JP) ................................ 2013-049075

(51) Int. Cl.
  *G02F 1/1335*    (2006.01)
  *G02F 1/1333*    (2006.01)
(52) U.S. Cl.
  CPC .. *G02F 1/133512* (2013.01); *G02F 1/133514* (2013.01); *G02F 1/133516* (2013.01); *G02F 2001/133302* (2013.01)
(58) Field of Classification Search
  CPC ......... G02F 1/133512; G02F 1/133514; G02F 1/133516; G02F 2001/133302
  See application file for complete search history.

(56) References Cited

U.S. PATENT DOCUMENTS 5,128,786 A    7/1992  Yanagisawa
5,786,042 A    7/1998  Inoue et al.
        (Continued)

FOREIGN PATENT DOCUMENTS

JP    9-15403 A    1/1997
JP    2006-39137 A    2/2006
        (Continued)

OTHER PUBLICATIONS

Japanese Office Action dated Aug. 30, 2016 for corresponding Japanese Application No. 2013-049075 with Partial Translation.

*Primary Examiner* — Nathanael R Briggs
(74) *Attorney, Agent, or Firm* — Typha IP LLC

(57) ABSTRACT

A liquid crystal display device includes a first substrate, a partition layer provided on the first substrate and defining plural pixel regions, colored layers of plural colors constituting color filters in the plural pixel regions, a second substrate opposite to the first substrate, and a liquid crystal material arranged between the first and second substrates. The partition layer includes a longitudinal light-shielding part made of a light-shielding resin and extending in a longitudinal direction, a lateral light-shielding part made of the light-shielding resin and extending in a lateral direction, and a light reducing part in which the colored layers including two or more of the colors overlap each other. At least one of the longitudinal light-shielding part and the lateral light-shielding part has a space to avoid contact with the other. The light reducing part fills the space between the longitudinal light-shielding part and the lateral light-shielding part.

11 Claims, 10 Drawing Sheets

(56) References Cited

U.S. PATENT DOCUMENTS

2006/0017865 A1    1/2006  Tsubata et al.
2012/0257296 A1*  10/2012  Wu .................. G02B 5/201
                                                    359/891

FOREIGN PATENT DOCUMENTS

JP      2006-98530 A     4/2006
JP      2009-53483 A     3/2009

* cited by examiner

DISPLAY DEVICE AND LIQUID CRYSTAL DISPLAY DEVICE

CROSS-REFERENCE TO RELATED APPLICATIONS

This application is a continuation of U.S. application Ser. No. 14/203,724 filed on Mar. 11, 2014. Further, this application claims priority from Japanese Application No. 2013-49075 filed on Mar. 12, 2013, the contents of which are hereby incorporated by reference into this application.

BACKGROUND OF THE INVENTION

1. Field of the Invention

The present invention relates to a display device and a liquid crystal display device.

2. Description of the Related Art

It is known that a black matrix is formed from resin on a color filter substrate of a liquid crystal display panel (JP 9-15403A). The resin is a photoresist, and the photoresist is patterned by photolithography. The black matrix is originally designed so that an opening has corners.

In a photolithography step, since a photomask has a shape almost equal to a designed shape, at an exposure step, exposure can be performed in the shape in which the opening has corners. However, at a development step, since developing liquid is hard to enter the corners, the opening is rounded and becomes small. As a result, there is a problem that light transmittance is reduced.

SUMMARY OF THE INVENTION

The invention has an object to provide a black matrix in which corners of an opening are not rounded.

(1) According to an aspect of the invention, a liquid crystal display device includes a first substrate, a partition layer provided on the first substrate and defining plural pixel regions, colored layers of plural colors constituting color filters in the plural pixel regions, a second substrate opposite to the first substrate, and a liquid crystal material arranged between the first substrate and the second substrate, the partition layer includes a longitudinal light-shielding part made of a light-shielding resin and extending in a longitudinal direction, a lateral light-shielding part made of the light-shielding resin and extending in a lateral direction, and a light reducing part in which the colored layers including two or more of the colors overlap each other, at least one of the longitudinal light-shielding part and the lateral light-shielding part has a space to avoid contact with the other, and the light reducing part fills the space between the longitudinal light-shielding part and the lateral light-shielding part. According to the invention, since the longitudinal light-shielding part and the lateral light-shielding part are arranged with the space therebetween, even if the partition layer is formed by photolithography, corners are not formed, and the opening is not rounded. Besides, since the light reducing part fills the space between the longitudinal light-shielding part and the lateral light-shielding part, the partition layer has sufficient characteristics as the black matrix.

(2) The liquid crystal display device as recited in (1) may be configured such that one of the longitudinal light-shielding part and the lateral light-shielding part has the space, and the other crosses the space as seen in planar view.

(3) The liquid crystal display device as recited in (2) may be configured such that widths of the longitudinal light-shielding part and the lateral light-shielding part in directions perpendicular to the extending directions are different from each other, and one of the longitudinal light-shielding part and the lateral light-shielding part, which has the smaller width, is interrupted.

(4) The liquid crystal display device as recited in any one of (1) to (3) may be configured such that the light reducing part includes the two colored layers arranged in the adjacent pixel regions of different colors.

(5) The liquid crystal display device as recited in any one of (1) to (4) may be configured such that each of the colored layers is arranged to overlap the longitudinal light-shielding part and the lateral light-shielding part.

(6) The liquid crystal display device as recited in (5) may be configured such that the two colored layers arranged in the adjacent pixel regions of different colors are adjacent not to overlap each other on the longitudinal light-shielding part and the lateral light-shielding part.

(7) According to another aspect of the invention, a display device includes plural pixels, a substrate, partition layers provided on the substrate and defining the plural pixels, a first color filter layer formed on the substrate, a second color filter layer formed on the substrate, and an overlapping part in which a part of the first color filter layer and a part of the second color filter layer overlap each other, the partition layers include plural first partition layers extending in a first direction, plural second partition layers extending in a second direction intersecting with the first direction, and plural third partition layers including the overlapping part, each of the plural first partition layers includes plural spaces arranged in the first direction, and each of the plural third partition layers is arranged in each of the plural spaces.

(8) The display device as recited in (7) may be configured such that the plural first partition layers and the plural second partition layers are made of a light-shielding resin.

(9) The display device as recited in (7) may be configured such that each of the plural second partition layers crosses each of the spaces.

(10) The display device as recited in (9) may be configured such that a whole region of each of the spaces is covered with the second partition layer and the third partition layer.

(11) The display device as recited in (7) may be configured such that widths of the first partition layers are smaller than widths of the second partition layers.

(12) The display device as recited in (7) may be configured such that the first color filter layer includes a first convex part extending in the first direction and protruding in the second direction, the second color filter layer includes a second convex part adjacent to the first color filter layer, extending in the first direction and protruding in the second direction, and the overlapping part includes the first convex part and the second convex part overlapping each other.

(13) The display device as recited in (7) may be configured such that the overlapping part does not overlap the plural first partition layers and the plural second partition layers as seen in planar view.

(14) The display device as recited in (7) may be configured such that the plural pixels include two pixels arranged in the first direction, and the space includes a part of a boundary part of the two pixels.

(15) The display device as recited in (7) may be configured such that each of the first partition layers is bent.

DETAILED DESCRIPTION OF THE INVENTION

Hereinafter, embodiments of the invention will be described with reference to the drawings.

Figure 1:
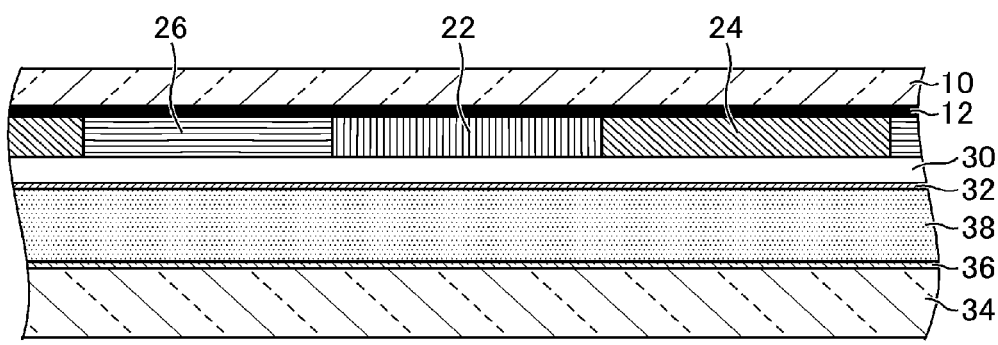
FIG. 1 is a sectional view showing a liquid crystal display device of an embodiment of the invention.

FIG. 1 is a sectional view showing a liquid crystal display device of an embodiment of the invention. The liquid crystal display device includes a first substrate 10 which is a light transmissive substrate such as, for example, a glass substrate. A partition layer 12 is formed on the first substrate 10. The partition layer 12 has a function as a black matrix.

Figure 2:
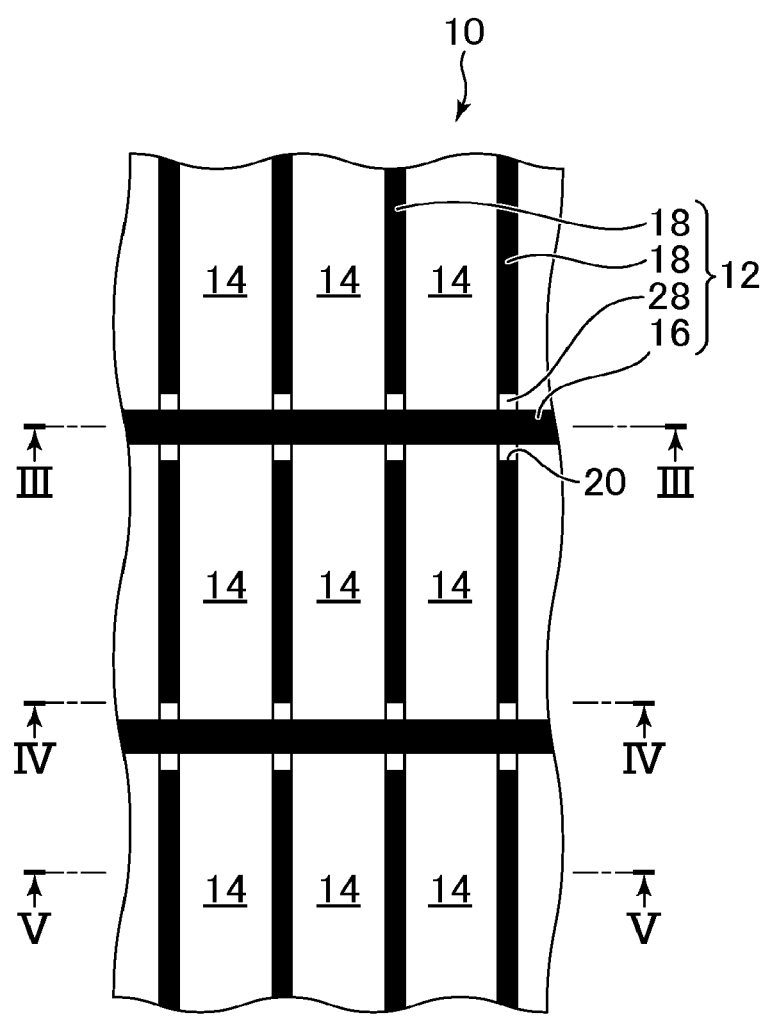
FIG. 2 is a plan view of a first substrate including a partition layer.

FIG. 2 is a plan view of the first substrate 10 including the partition layer 12. The partition layer 12 defines plural pixel regions 14. One pixel region 14 is a sub-pixel of one color, and a full-color pixel includes plural adjacent sub-pixels.

The partition layer 12 includes lateral light-shielding parts 16 extending in a lateral direction (right and left direction of FIG. 2). The plural lateral light-shielding parts 16 are arranged with intervals in a longitudinal direction (up and down direction of FIG. 2). The longitudinal direction and the lateral direction are not limited to orthogonal directions as long as the directions cross each other. A line drawn in the direction in which the lateral light-shielding part 16 extends may be a straight line or a curved line, or may be bent. The lateral light-shielding part 16 is made of a light-shielding resin.

The partition layer 12 includes longitudinal light-shielding parts 18 extending in the longitudinal direction (up and down direction of FIG. 2). The plural longitudinal light-shielding parts 18 are arranged with intervals in the lateral direction (right and left direction of FIG. 2). The longitudinal light-shielding part 18 is interrupted in the extending direction. A line drawn in the direction in which the longitudinal light-shielding part 18 extends may be a straight line or a curved line, or may be bent. The longitudinal light-shielding part 18 is made of a light-shielding resin.

The longitudinal light-shielding part 18 and the lateral light-shielding part 16 are different in width (width perpendicular to the extending direction). The width of the longitudinal light-shielding part 18 is smaller than the width of the lateral light-shielding part 16. The lateral light-shielding part 16 and the longitudinal light-shielding part 18 are arranged with a space 20 so that they do not cross each other.

Particularly, the lateral light-shielding part 16 passes through a gap formed by the interruption of the longitudinal light-shielding part 18. The longitudinal light-shielding part 18 and the lateral light-shielding part 16 do not contact each other.

As shown in FIG. 1, the liquid crystal display device includes colored layers 22, 24 and 26 of plural colors. The colored layers 22, 24 and 26 of plural colors constitute color filters in the plural pixel regions 14 shown in FIG. 2. The colored layers 22, 24 26 of plural colors are formed on the first substrate 10 so that either one of them is arranged in each of the pixel regions 14. The plural colors are red (R), green (G) and blue (B). The colored layer of green (G) has the highest light transmittance and has high visibility. The colored layer of blue (B) has the lowest light transmittance and has low visibility.

Figure 3:
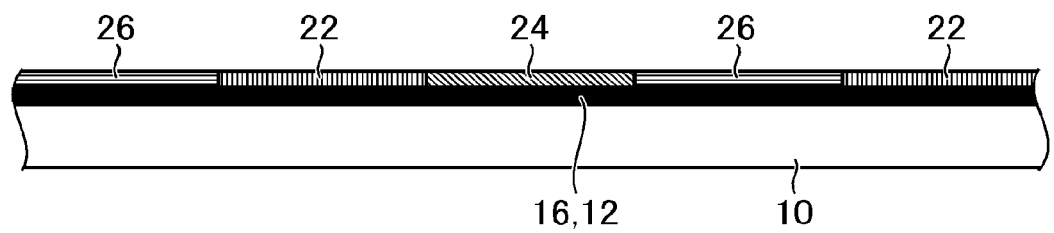
FIG. 3 is a III-III line sectional view of the first substrate shown in FIG. 2.
Figure 4:
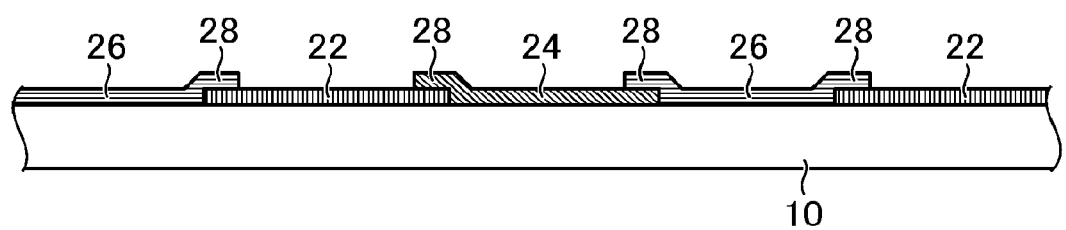
FIG. 4 is a IV-IV line sectional view of the first substrate shown in FIG. 2.
Figure 5:
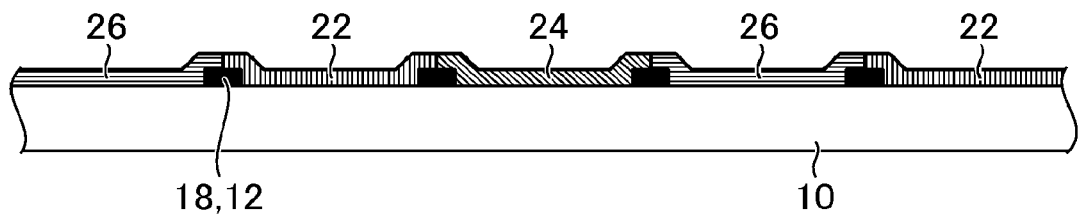
FIG. 5 is a V-V line sectional view of the first substrate shown in FIG. 2.

FIG. 3, FIG. 4 and FIG. 5 are respectively a III-III line sectional view, a IV-IV line sectional view and a V-V line sectional view of the first substrate 10 shown in FIG. 2. As shown in FIG. 3 and FIG. 5, each of the colored layers 22, 24 and 26 is arranged so as to overlap the longitudinal light-shielding part 18 and the lateral light-shielding part 16. However, the two colored layers 22 and 24, 22 and 26, or 24 and 26 arranged in the adjacent pixel regions 14 of different colors are adjacent not to overlap each other on the longitudinal light-shielding part 18 and the lateral light-shielding part 16.

As shown in FIG. 2 and FIG. 4, the partition layer 12 includes a light reducing part 28 having a structure in which the colored layers 22, 24 and 26 of two or more colors overlap each other. As shown in FIG. 2, the light reducing part 28 fills the space 20 between the longitudinal light-shielding part 18 and the lateral light-shielding part 16. The light reducing part 28 includes the two colored layers 22 and 24, 22 and 26, or 24 and 26 arranged in the adjacent pixel regions 14 of different colors.

According to this embodiment, since the longitudinal light-shielding part 18 and the lateral light-shielding part 16 are arranged with the space 20, even if the partition layer 12 is formed by photolithography, a corner is not formed and the opening is not rounded. Besides, since the light reducing part 28 fills the space 20 between the longitudinal light-shielding part 18 and the lateral light-shielding part 16, the partition layer 12 has sufficient characteristics as a black matrix.

As shown in FIG. 1, a first alignment film 32 is formed through an over coat layer 30 so as to cover the colored layers 22, 24 and 26. A second substrate 34, which is a light transmissive substrate such as, for example, a glass substrate, is formed to face the first substrate 10. A second alignment film 36 is formed on a surface of the second substrate 34 opposite to the first substrate 10. A cell gap is formed by a not-shown spacer between the first alignment film 32 and the second alignment film 36, and a liquid crystal material 38 is arranged between the first substrate 10 and the second substrate 34. Particularly, the liquid crystal material 38 is arranged between the first alignment film 32 and the second alignment film 36.

Figure 6:
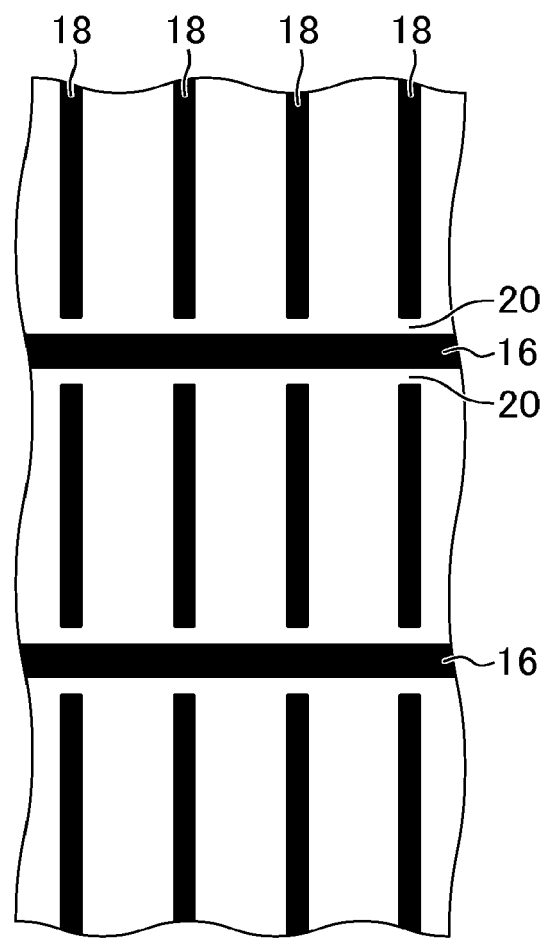
FIG. 6 is a view for explaining a manufacturing method of the liquid crystal display device of the embodiment of the invention.

FIG. 6 to FIG. 9 are views for explaining a manufacturing method of the liquid crystal display device of the embodiment of the invention. In this embodiment, as shown in FIG. 6, the first substrate 10 is prepared in which the light reducing part 28 of the partition layer 12 is not provided, but the lateral light-shielding parts 16 and the longitudinal light-shielding parts 18 are formed. The lateral light-shielding parts 16 and the longitudinal light-shielding parts 18 are formed by patterning a photoresist as a light-shielding resin by photolithography. Since the lateral light-shielding parts 16 and the longitudinal light-shielding parts 18 are arranged with the spaces 20, corners are not formed, and it does not occur that developing liquid is hard to enter in development performed after exposure. Accordingly, the lateral light-shielding parts 16 and the longitudinal light-shielding parts 18 can be formed into a precise shape corresponding to the shape of an exposure mask.

Next, the colored layers 22, 24 and 26 of plural colors are formed. The photolithography can be applied also to the formation of the colored layers 22, 24 and 26. In that case, the colored layers 22, 24 26 are also formed of a photoresist.

Figure 7:
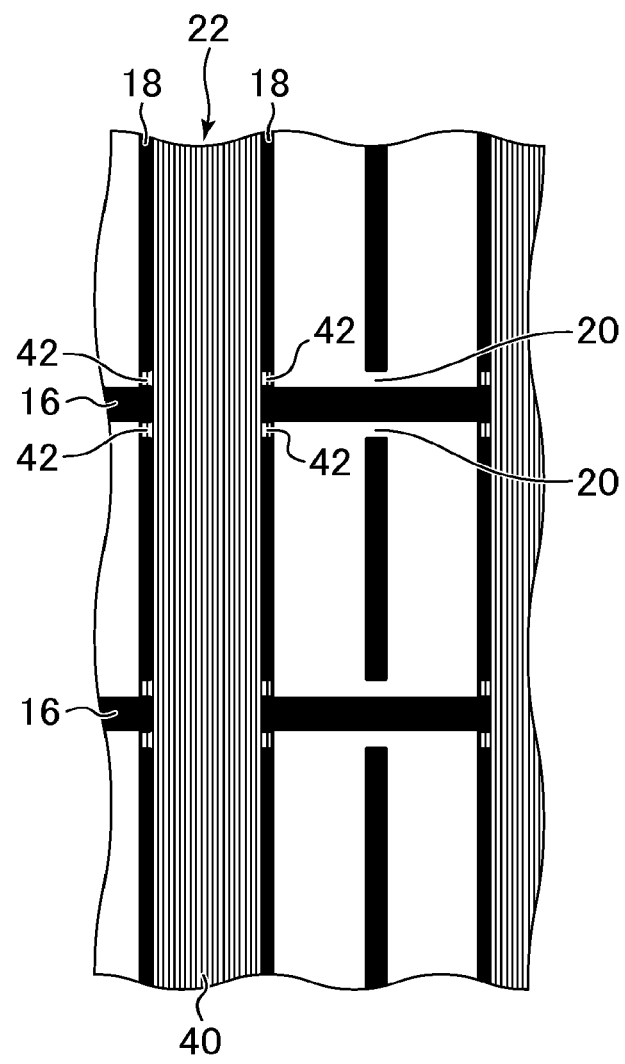
FIG. 7 is a view for explaining the manufacturing method of the liquid crystal display device of the embodiment of the invention.

As shown in FIG. 7, the colored layer 22 which is a first color is formed. The colored layer 22 is arranged so as to extend in the longitudinal direction. Particularly, the colored layer 22 is arranged between the longitudinal light-shielding parts 18 adjacent to each other in the lateral direction. The colored layer 22 includes a stripe-shaped main body part 40. The main body part 40 is formed so that both ends thereof extending in the length direction are respectively placed on ends of the adjacent longitudinal light-shielding parts 18. The colored layer 22 includes convex parts 42 protruding from both the ends of the main body part 40 in directions opposite to each other. The convex parts 42 are arranged in the space 20 (FIG. 6) for forming the light reducing part 28, that is, in the space 20 formed between the lateral light-shielding part 16 and the longitudinal light-shielding part 18 by the interruption of one of them.

Figure 8:
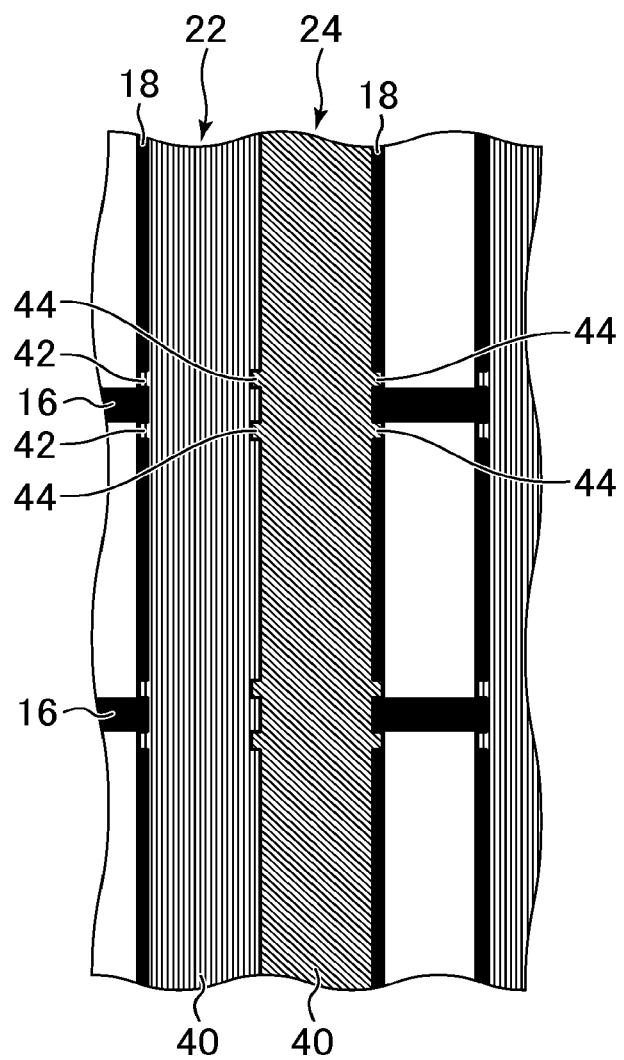
FIG. 8 is a view for explaining the manufacturing method of the liquid crystal display device of the embodiment of the invention.

As shown in FIG. 8, the colored layer 24 which is a second color is formed. The second color colored layer 24 has the same details as the first color colored layer 22, and is formed adjacent to the first color colored layer 22. The second color colored layer 24 also includes convex parts 44. The convex parts 44 are arranged in the space 20 (FIG. 6) for forming the light reducing part 28, that is, in the space 20 formed between the lateral light-shielding part 16 and the longitudinal light-shielding part 18 by the interruption of one of them. Accordingly, the convex part 42 of the first color colored layer 22 and the convex part 44 of the second color colored layer 24 overlap each other, and the light reducing part 28 (FIG. 4) is formed.

Figure 9:
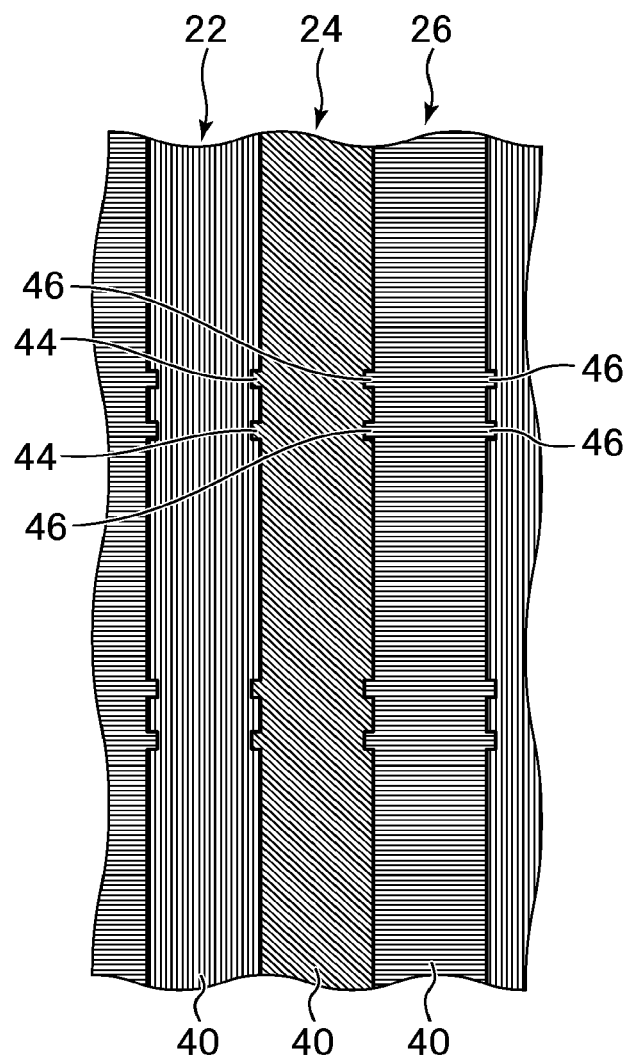
FIG. 9 is a view for explaining the manufacturing method of the liquid crystal display device of the embodiment of the invention.

As shown in FIG. 9, the colored layer 26 which is a third color is formed. The third color colored layer 26 has the same details as the first color colored layer 22, and is formed between the first color and the second color colored layers 22 and 24. The third color colored layer 26 also includes convex parts 46. The convex parts 46 are arranged in the space 20 (FIG. 6) for forming the light reducing part 28, that is, in the space 20 formed between the lateral light-shielding part 16 and the longitudinal light-shielding part 18 by the interruption of one of them. Accordingly, the convex part 42 (FIG. 7) of the first color colored layer 22 and the convex part 46 (FIG. 9) of the third color colored layer 26 overlap each other, and the light reducing part 28 is formed (FIG. 4). Besides, the convex part 44 (FIG. 8) of the second color colored layer 24 and the convex part 46 (FIG. 9) of the third color colored layer 26 overlap each other, and the light reducing part 28 is formed (FIG. 4)

By the above process, the partition layer 12 functioning as the black matrix and the colored layers 22, 24 and 26 are formed. Further, the manufacturing method of the liquid crystal display device includes contents obvious from the foregoing description of the liquid crystal display device.

Modified Example

Figure 10:
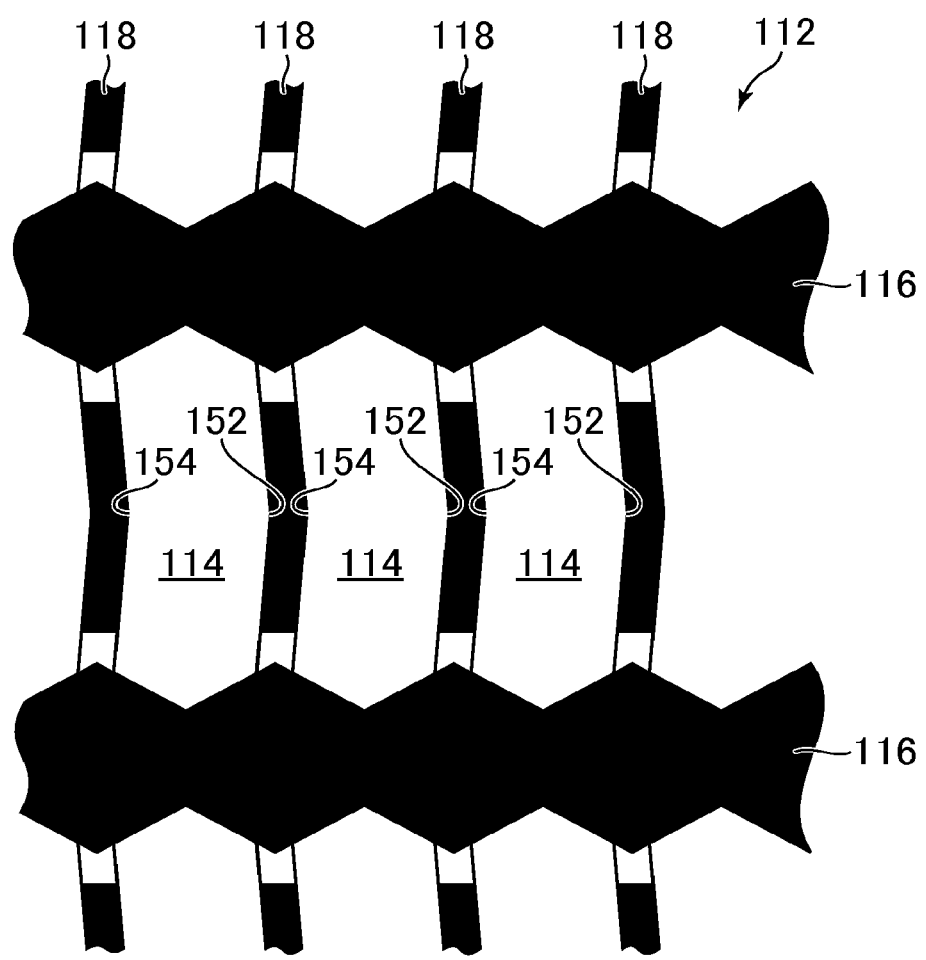
FIG. 10 is a view for explaining a modified example of the liquid crystal display device of the embodiment of the invention.

FIG. 10 is a view for explaining a modified example of the liquid crystal display device of the embodiment of the invention. In the modified example, the shape of a partition layer 112 is different from that of the above embodiment. That is, a pixel region 114 has such a shape that a convex part 152 is provided at one side in a lateral direction, and a concave part 154 is provided at the other side. In other words, a longitudinal light-shielding part 118 of the partition layer 112 is bent between adjacent lateral light-shielding parts 116. The partition layer 112 has the shape as stated above because a multi-domain system for expanding a viewing angle is applied. In the multi-domain system, two or more regions in which alignment states of liquid crystal molecules are different exist in one pixel region 114.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
   a first substrate;
   a first colored layer extending in a first direction;
   a second colored layer adjacent to the first colored layer and extending in the first direction;
   a first light-shielding part overlapping with the first colored layer and the second colored layer and extending in the first direction;
   a second light-shielding part adjacent to the first light-shielding part in the first direction and extending in the first direction;
   a third light-shielding part extending in a second direction which intersects the first direction; and
   a second substrate opposed to the first substrate,
   wherein the second light-shielding part overlaps with the third light-shielding part,
   wherein the first light-shielding part is not in contact with the third light-shielding part.

2. The display device according to claim 1,
   wherein one of the first light-shielding part and the third light-shielding part has a space to avoid contact with the other,
   wherein the second light-shielding part is provided in the space.

3. The display device according to claim 1,
   wherein the first light-shielding part and the third light-shielding part are made of a light-shielding resin.

4. The display device according to claim 1,
   wherein the first colored layer at an end overlaps with the second colored layer at an end,
   wherein the second light-shielding part is made of an overlap portion of the end of the first colored layer and the end of the second colored layer.

5. The display device according to claim 1,
   wherein a width in the second direction of the first light-shielding part and a width in the second direction of the second light-shielding part are same width.

6. The display device according to claim 1,
   wherein a width in the first direction of the second light-shielding part is wider than a width in the first direction of the third light-shielding part.

7. The display device according to claim 1,
   wherein the third light-shielding part has a wider portion at an overlap position of the third light-shielding part and the second light-shielding part than other portions.

8. The display device according to claim 4,
wherein a width in the second direction of the overlap portion is equal to or less than a width in the second direction of the first light-shielding part.

9. A display device comprising:
a first substrate;
a first colored layer extending in a first direction;
a second colored layer adjacent to the first colored layer and extending in the first direction;
a first light-shielding part extending in a second direction which intersects the first direction;
a second light-shielding part overlapping with the first colored layer and the second colored layer and extending in the first direction; and
a second substrate opposed to the first substrate,
wherein one of the first light-shielding part and the second light-shielding part has a space to avoid contact with the other,
wherein the first colored layer and the second colored layer are overlapped between the first light-shielding part and the second light-shielding part.

10. The display device according to claim 9,
wherein the first light-shielding part and the second light-shielding part are made of a light-shielding resin.

11. The display device according to claim 9,
wherein the first light-shielding part has a wider portion in the space than other portions.

* * * * *